Patented Nov. 10, 1942

2,301,900

UNITED STATES PATENT OFFICE 2,301,900

MEDIUM FOR USE IN MAKING CAMERA COPY AND METHOD OF PREPARING THE SAME

Maurice D. McIntosh, Cleveland Heights, Ohio, assignor to Louis S. Sanders, Lakewood, Ohio No Drawing. Application May 20, 1940, Serial No. 336,211

17 Claims. (Cl. 41—41)

This invention relates as indicated to a medium for use in making camera copy and to a method of preparing the same.

In the prior art, a process of making a shading medium for use in photoengraving is disclosed, in which "Ben Day" patterns are formed on sheets of transparent material, such as "Cellophane" by printing the pattern on such sheets with a photographically transparent and water-impervious ink containing a chemical such as a silver salt, which upon application of a suitable reagent such as an acid become photographically visible or black.

It is virtually impossible by the use of ordinary printing plates and presses to apply the chemically developable material uniformly in the form of sharp, clean-cut patterns. Patterns (especially fine screens), printed on a base such as cellulose acetate, "Cellophane" or the like are always somewhat ragged and heavy at the edges and faint in the center, and in some parts are entirely absent from the base sheet. Upon development of these printed patterns, it will be found that they are not clean cut or entirely opaque. Even though the developed patterns on such imprinted sheets are not clean cut and entirely opaque, they may serve somewhat satisfactorily for camera copy purposes, that is, the transparent sheet bearing the developed pattern can be placed over a line drawing and photographed as a part of the composite copy. But it will be impossible to use such sheets directly as photographic transparencies because of the lack of complete opacity of the developed patterns.

By "photographic transparency" is meant an element having both transparent and opaque areas which is adapted to be interposed between a light source and a light-sensitive material. The light-sensitive material naturally will record the image of the transparent areas of the photographic transparency. In this use, it is necessary that the opaque areas, which are the developed patterns on the transparent sheet, be completely opaque and allow no effective light to pass therethrough.

In the reproduction field, there are many instances where it is desirable to have a transparent sheet capable of being developed to various opaque patterns in desired areas, which can be used directly as a negative transparency itself, or in conjunction with other negative or positive transparencies.

Furthermore, no attempt is made in the aforesaid prior art disclosure to show how a "silver salt," which is the only chemically developable material referred to in the patent, can be compounded in an ink suitable for printing, and remain transparent and colorless upon drying. Silver salts are extremely undesirable if not impossible to use in this connection because of their sensitivity to light. If the patterns were formed of any silver salt, they might be transparent or colorless for a short while, but would very soon darken or become discolored due to the action of light. This would naturally make the sheet worthless for its intended purpose.

Said prior art further discloses that the silver salts can be developed by means of an acid. There are some few chemical compounds that might be said to have acidic properties which will develop silver compounds, but to say broadly that an acid will develop silver salts is completely misleading, because there are a great number of acids which will not develop them in any sense.

It is a primary object of the present invention to provide a medium of the aforesaid character for use in making camera copy, which medium shall be characterized by sharp, clear-cut patterns, capable of being developed to substantially complete opacity, and which medium is therefore particularly adapted for use as a photographic transparency.

A further object of the invention is to provide a medium of the character described, the patterns of which are formed of compounds other than silver salts, and which compounds are not subject to rapid deterioration through exposure to light.

A still further object of the invention is to provide a medium of the character described, the patterns of which are capable of being developed by a variety of developers other than acids.

To the accomplishment of the foregoing and related ends, said invention, then, consists of the means hereinafter fully described and particularly pointed out in the claims.

The following description sets forth in detail certain means and modes of carrying out the invention, such disclosed means and modes illustrating however, but a few of the various ways in which the principle of the invention may be used.

In accordance with the invention, I take a sheet of a light-transmitting or transparent material such as cellulose acetate, "Cellophane" or the like, and of a thickness of about .003", and first coat such sheet with a very thin solution of plain gelatin containing methyl alcohol and formaldehyde, to render the gelatin water-insoluble after the sheet has been dried, and tenaciously adhered to the sheet. Acetate sheeting having such a sub-coating of gelatin, and known as sub-coated acetate sheeting is also available in the market.

Over this initial or sub-coating of gelatin is applied a second coating, heavier than the initial coating, heavier than the initial coating, of gelatin and ammonium bichromate. This coating is prepared in the following manner:

To 100 parts of cold water are added 15 parts of dry gelatin, the gelatin being permitted to soak in the cold water for thirty minutes, after which the water is heated to 120° F. to cause the gelatin to become dissolved. To this solution are then added 10 parts of a 20% solution of ammonium bichromate and 40 parts of denatured alcohol.

The aforesaid solution is applied at a temperature of about 100° F. to the sub-coated acetate sheeting, either by roll, dip, spray, or whirl coating, the sub-coating of gelatin causing the gelatin-bichromate coating to adhere thereto.

After this second coating is thoroughly dry, it is exposed to strong light through a negative of any desired Ben Day pattern. Where the light strikes the gelatin-bichromate coating, such coating is chemically changed and rendered insoluble, while the unexposed areas of the coating remain soluble.

The sheet is then washed in running water having a temperature of about 150° F. for several minutes to remove all of the soluble portions of the coating, the exposed insoluble portions remaining intact. The sheet now bears the image of the Ben Day negative which has been used, in areas of insoluble gelatin.

The sheet is then immersed for about one minute in a 3% solution of basic lead acetate. The lead solution is absorbed and mordanted by the insoluble gelatin pattern, but not by the acetate sheet itself. The sheet is then rinsed in running cold water and dried.

The gelatin pattern containing the absorbed basic lead acetate is practically transparent and photographically invisible.

Application of a solution of 4% sodium sulphide to the sheet will develop the pattern to an opaque black, which is capable of being photographed.

In this way, I produce a transparent base sheet bearing a photographically invisible and transparent developable Ben Day pattern, which sheet may be used over line drawings in the manner described in the aforesaid prior art disclosure, for the production of related shading, without in any way impairing the photographic qualities of the line drawing itself.

The principal advantage of the aforesaid method of preparing the sheet resides in the fact that the transparent base sheet is coated uniformly with a gelatin film of such character that the portions thereof which are exposed to light through a photographic negative bearing the desired pattern are rendered insoluble and remain adhered to the base, while the unexposed portions can be completely and cleanly removed, as described. The gelatin-bichromate light reaction is one that is employed extensively in the graphic arts and which will give extremely sharp reproduction of light images. The insoluble gelatin patterns produced on the sheets by means of the gelatin-bichromate light reaction are extremely clean cut and of uniform thickness, and when subjected to a solution of the desired developable chemical are impregnated completely and uniformly with such chemical. With the proper strength of solution of such chemical, it is possible to impregnate the gelatin pattern with sufficient developable material to give complete opacity to the pattern upon development. Hence, the sheets prepared in accordance with this invention can be used directly as a photographic transparency.

A number of chemical reactions, other than the lead-sulphide reaction described, may be utilized in the aforesaid method. It is only necessary to impregnate the gelatin pattern with a chemical which is capable of development by application of another chemical. The chemical must be applied to the gelatin pattern in a soluble form and if it is not mordanted directly by the gelatin as is the case with basic lead acetate, it must be rendered insoluble in the gelatin by application of another chemical. This insoluble form which is to be later developed with the proper developer must be of an actinic color and virtually transparent, and, upon development, must be of a non-actinic color and photographically opaque.

Among other suitable chemical reactions may be listed the following:

| Gelatin pattern impregnated with: | Impregnating chemical rendered insoluble in the gelatin with: | Developer |
| --- | --- | --- |
| 40% solution of cobaltous nitrate. | 3% solution ammonium hydroxide or a 20% solution of sodium tungstate or a 20% solution of di-sodium phosphate. | 4% solution of sodium sulfide. |
| Solution containing 20% cupric nitrate and 10% ammonium hydroxide. | Mordanted by gelatin and rinsing in water. | Solution of 1% di-thiooxamide in ½% sodium hydroxide. |
| 20% solution of ferric nitrate. | 5% solution of di-sodium phosphate or a 5% solution of sodium hydrogen arsenate. | 4% solution of sodium sulfide. |

Other modes of applying the principles of my invention may be employed instead of the one explained, change being made as regards the means and steps herein disclosed, provided those stated by any of the following claims or their equivalent be employed.

I therefore particularly point out and distinctly claim as my invention:

1. The method which consists in applying to a transparent base sheet a coating of a material which on exposure to light is rendered insoluble, exposing said coating to light through a negative bearing a Ben Day pattern, removing the unexposed areas of the coating from said sheet, and impregnating the insoluble areas with a substantially transparent and photographically invisible chemically-developable material.

2. The method which consists in applying a gelatin coating containing a bichromate to a transparent base sheet, exposing said coating to light through a negative bearing a Ben Day pattern, removing the unexposed areas of the coating from said sheet, and impregnating said exposed areas with a substantially transparent and photographically invisible chemically-developable material.

3. The method which consists in applying a gelatin coating containing a bichromate to a transparent base sheet, exposing said coating to light through a negative bearing a Ben Day pattern, removing the unexposed areas of the coating from said sheet, and impregnating said exposed areas with basic lead acetate.

4. The method which consists in applying a gelatin coating containing ammonium bichromate to a transparent base sheet, exposing said coating to light through a negative bearing a Ben Day pattern, washing said sheet to remove the unexposed portions of said coating, and immersing said sheet in a solution of basic lead acetate, whereby to cause said acetate to be absorbed by the exposed areas of said coating, said lead acetate containing areas being substantially transparent and photographically invisible.

5. The method which consists in applying a gelatin coating containing ammonium bichromate to a transparent base sheet, exposing said coating to light through a negative bearing a Ben Day pattern to render the exposed areas insoluble, washing said sheet to remove the unexposed areas of said coating, immersing the sheet in a 3% solution of basic lead acetate to cause said acetate to be absorbed and mordanted by the insoluble gelatin areas, and rinsing and drying the sheet, said lead acetate containing areas being substantially transparent and photographically invisible.

6. A medium for use in making camera copy comprising a transparent base sheet having a Ben Day pattern thereon formed by separated areas of gelatin impregnated with a chemically-developable material, said impregnated pattern being substantially transparent and photographically invisible.

7. A medium for use in making camera copy comprising a transparent base sheet having a Ben Day pattern thereon formed by separated areas of gelatin and a chemically-developable material insoluble in the gelatin said impregnated pattern being substantially transparent and photographically invisible.

8. A medium for use in making camera copy comprising a transparent base sheet having a Ben Day pattern thereon comprising gelatin impregnated with basic lead acetate, said pattern being substantially transparent and photographically invisible.

9. A medium for use in making camera copy comprising a transparent base sheet having a Ben Day pattern thereon comprising gelatin impregnated with a cobaltous compound, said pattern being substantially transparent and photographically invisible.

10. A medium for use in making camera copy comprising a transparent base sheet having a Ben Day pattern thereon comprising gelatin impregnated with a cupric compound, said pattern being substantially transparent and photographically invisible.

11. The method which consists in applying to gelatin-coated acetate sheeting a coating of gelatin and ammonium bichromate, exposing said second coating to light through a negative bearing a Ben Day pattern, removing the unexposed areas of said second coating from said sheet, and impregnating said exposed areas with a chemically-developable material.

12. The method which consists in applying to gelatin-coated acetate sheeting, a second coating made by adding to 115 parts of a gelatin solution 10 parts of a 20% solution of ammonium bichromate and 40 parts of denatured alcohol, exposing said second coating to light through a negative bearing a Ben Day pattern, removing the unexposed areas of said second coating from said sheet, and impregnating said exposed areas with a chemically developable material.

13. The method which consists in applying to gelatin-coated acetate sheeting a coating of gelatin containing a bichromate, exposing said second coating to light through a negative bearing a Ben Day pattern, and removing the unexposed areas of said second coating from said sheet.

14. The method which consists in applying to gelatin-coated acetate sheeting a coating of gelatin containing a bichromate, exposing said second coating to light through a negative bearing a Ben Day pattern, removing the unexposed areas of said second coating from said sheet, and impregnating said exposed areas with a chemically-developable material.

15. The method which consists in applying to gelatin-coated acetate sheeting a coating of a material which on exposure to light is rendered insoluble, exposing said second coating to light through a negative bearing a Ben Day pattern, and removing the unexposed areas of said second coating from said sheet.

16. The method which consists in applying to gelatin-coated acetate sheeting a coating of a material which on exposure to light is rendered insoluble, exposing said second coating to light through a negative bearing a Ben Day pattern, removing the unexposed areas of said second coating from said sheet, and impregnating the insoluble areas with a chemically-developable material.

17. A medium for use in making camera copy comprising a gelatin-coated acetate base sheet having a Ben Day pattern thereon comprising gelatin impregnated with a chemically-developable material.

MAURICE D. McINTOSH.